United States Patent Office 2,762,775
Patented Sept. 11, 1956

2,762,775
WAX AND POLYETHYLENE FOR FILTER ADHESIVES

Edward G. Foehr, San Rafael, Calif., assignor to California Research Corporation, San Francisco, Calif., a corporation of Delaware No Drawing. Application September 28, 1953,
Serial No. 382,862

9 Claims. (Cl. 252—56)

This invention pertains to lubricating oil compositions useful as adhesives for certain stationary industrial impingement-type filters. In particular, the invention set forth herein pertains to new filter adhesives especially adapted for stationary filters used for the removal of solid particles (e. g., dust particles) from gaseous media (e. g., air) in factories, office buildings, hospitals, auditoriums, homes, etc.

As used herein the term "stationary filters" means filters which are used on stationary units such as buildings, in contrast to mobile filter units which are used on railroad diesel engines and on various automotive equipment.

Filter adhesives which are presently used for stationary filters vary in their compositions. For example, some filter adhesives are oil compositions thickened with metal soaps, e. g., zinc stearate; others are oil compositions having salts such as zinc chloride, zinc sulfate, etc. dispersed therein; while still others contain inert organic liquids such as tricresylphosphate. Certain of these filter adhesives have the disadvantage of excessive bleeding (requiring the use of drip pans beneath the filter units to catch the dripping oil), on the one hand; and, on the other hand, the disadvantage of forming too thin films on the filters to catch more than a minor proportion of the dust from air streams (such thin films do not provide a reservoir of oil for adequate wicking, permitting dust particles to pass through the filter unit).

For efficient operation of filters, the filter adhesive surface must always be oily to entrap the dust particles by wicking out and wetting these particles, yet not so fluid that the filter adhesive will run from the filters.

It is known that polybutenes can be dispersed in petroleum oils to form oil compositions of higher viscosity. However, when such polybutene thickened oils are applied to filter units, the filter unit surfaces soon become too rigid to entrap any solid particles from the air stream passing through the filter unit. Such filter adhesives retain only a very small amount of dust before becoming practically useless. Also, such polybutene thickened oils are normally too tacky and too stringy to permit "wicking."

As used herein, the term "wicking" means that property of a fluid whereby the oil continually wets the dust particles and retains the dust particles on the filter unit. When a layer of dust impinges upon a filter unit to which has been applied a filter adhesive of the present invention, the first layers of dust impinge upon the thickened oil layer and are entrapped thereon. The filter oil then quickly surrounds and engulfs the dust particles. The faster the oil passes through the layer of dust on the surface to engulf that dust layer, the greater the "wicking" tendency. "Wicking" should be as rapid as possible.

As set forth in Hotten patent application Serial No. 292,229, filed June 7, 1952, now abandoned, filter adhesives are obtained by dispersing polyethylenes in lubricating oils. Such filter adhesives, which are particularly useful in railroad diesel engines, have become extremely popular in the railroad industry. However, the transition point (i. e., the melting point) of such polyethylene- oil compositions usually is higher than desirable for ready application onto stationary filter units. It is necessary to heat the adhesive to a relatively high temperature before the adhesive can be applied to the filter unit. Temperatures encountered in railroad diesel engine filter service are as high as 190° F., making it mandatory that the filter adhesives remain on the filter unit at that temperature without flowing therefrom. On the other hand, service temperatures of stationary filters only rarely exceed 100° F. Thus, the transition points of commercial filter adhesives can be lower than those of railroad filter adhesives.

Also, filtered air for a railroad diesel engine is used by the engine itself. Therefore, it would not be amiss if the filtered air had an odor traceable to the filter adhesive. However, it is a requisite that the filter adhesives of the present invention impart no detectable odor to the passing air streams.

Furthermore, it is of considerable advantage when personnel of office buildings, for example, can remove dust and old adhesives from stationary filters and apply fresh adhesives onto the units at reasonable temperatures without the necessity of having special apparatus therefor.

As noted hereinabove, a filter adhesive containing only polyethylene (e. g., about 2%, by weight) as the thickening agent has a relatively high transition point. One would believe that the transition point could be decreased by dispersing smaller amounts (e. g., 1%) of polyethylene in an oil. On the contrary, when 1% of polyethylene is solubilized in hot oil, and the solution is cooled, a continuous gel structure is not formed.

The attempted use of waxes alone as thickening agents results in the formation of filter adhesives having restricted and inadequate "wicking." A large proportion of the dust particles in air streams do not cling to the filter adhesive but merely pass through the filter unit.

Therefore, it is a primary object of this invention to prepare filter oil adhesives having low transition points and which can be readily applied onto commercial filter units without the use of any complicated apparatus.

According to the present invention, it has been discovered that highly efficient filter oils useful primarily for stationary filter units are obtained by thickening a hydrocarbon oil with a mixture of wax and polyethylene. Thus, the filter oil adhesives of the present invention comprise a major proportion of a hydrocarbon oil and a mixture of wax and polyethylene.

Suitable base oils include a wide variety of hydrocarbon lubricating oils (i. e., hydrocarbon oils of lubricating viscosity) such as naphthenic base, paraffin base and mixed base mineral oils, other hydrocarbon lubricants, e. g., lubricating oils derived from coal and synthetic oils, e. g., alkylene polymers (such as polymers of ethylene, propylene, butylene, etc., and mixtures of polymeric olefins), alkyl benzene polymers, etc.

The polyethylenes used according to this invention in the preparation of filter oils are essentially linear polymers of ethylene of the general formula

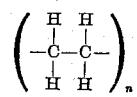

wherein "$n$" represents the number of monomers present in the polymers. These polyethylenes, which are solids, include polymers of ethylene having molecular weights ranging from 10,000 to 40,000 as determined by a method set forth in "Polyethylene for Paper Coatings," issued by the Bakelite Company, New York, N. Y. (1951). According to this method, which is a modification of the Staudinger method, the viscosity of a solution of 4 grams of polyethylene in one liter of tetralin is determined at 130° C. The molecular weight is then calculated from the following equation:

$$M = \frac{K \log \eta_r}{C}$$

wherein "M" is used to represent the molecular weight, "K" is a constant ($4.03 \times 10^4$ grams per liter), "$\eta_r$" the relative viscosity (i. e., viscosity of the solution/viscosity of tetralin) and "C" the base molar concentration, i. e., $$\frac{4.0 \text{ grams/liter}}{14 \text{ grams/mol } (-CH_2)} = 0.285 \frac{\text{mole } (-CH_2)}{\text{liter}}$$

Although polyethylenes useful according to this invention in filter oil compositions can have molecular weights ranging from 10,000 to 40,000, it is preferred to use polyethylenes having molecular weights in the range of 15,000 to 25,000.

Waxes which are used in the filter adhesive compositions of the present invention have average melting points ranging from 70° C. to 140° C., preferably above 90° C., and include petroleum waxes, synthetic waxes, animal waxes, paraffin waxes, etc. It is particularly preferred that the filter adhesives contain paraffin waxes.

Waxes which can be used in the filter adhesives compositions of the present invention include the following (with the average melting points in parentheses): Acrawax (96° C.), Acrawax C (138° C.), Acrawax B (80° C.), Ozowax (76-85° C.), Stroba Wax (98-100° C.), Alabacer (95-97° C.), Durocer (120-127° C.) (all of which are trade names for products sold by the Glyco Products Company, Inc. of Brooklyn, New York), beeswax (66° C.), candelilla wax (71° C.), glyceryl monostearate, hentriacontanone (76° C.), etc.

The filter oil compositions of the present invention are sufficiently viscous to remain on the filter unit; yet, these compositions slowly bleed to entrap dust particles, that is, the filter oils of the present invention have a high "wicking" tendency while still being retained on the filter elements. It is desirable in the preparation of filter adhesives that the adhesive retains the lowest viscosity possible permitting free "wicking" without the filter adhesive dripping from the filter unit.

For maximum effectiveness in "wicking" and for greatest ease of application onto filter materials, the maximum transition point of the filter adhesives herein is 140° F.

Effective filter oil adhesives are obtained by varying the ratios, by weight, of the waxes and the polyethylenes. Although the wax/polyethylene ratios, by weight, can have values from 0.5 to 12, it is preferred that the wax/polyethylene ratios have values from 2 to 5.

The wax-polyethylene mixture may be incorporated into the lubricating oil in any desired manner. For example, the solid polyethylene and solid wax may be ground together, which mixture may then be dispersed in oil and the oil mixture heated until the wax and polyethylene become dissolved therein, after which the whole mixture is cooled to form the desired filter adhesive. On the other hand, polyethylene may be dissolved in a hot hydrocarbon oil, after which wax is incorporated into the polyethylene-oil mixture until the polyethylene and wax are thoroughly blended together in the hot oil, after which the whole mixture is cooled to the desired gel composition. The hot compositions may be cooled slowly or rapidly depending on the nature of the crystal lattice network desired in the final filter adhesive composition.

For their use in filter oils for stationary filter units, the wax-polyethylene blends are useful in concentrations ranging from 1%, by weight, to 10%, by weight. It is preferred that these blends be used in amounts of 4% to 6%, by weight. The wax-polyethylene blends are present in the hydrocarbon oils in amounts sufficient to thicken the oils to the consistency of filter adhesives, yet, in amounts insufficient to thicken the oils to the consistency of greases.

For purposes of this invention, it is preferred that the filter adhesives comprise lubricating oils thickened with wax-polyethylene mixtures wherein the ratio by weight of wax to polyethylene has a value from 2 to 5, wherein the polyethylene has a molecular weight of about 19,000, and wherein the wax has a melting point of about 60° C. to about 100° C.

The effectiveness of the composition of the present invention as filter adhesives was determined by obtaining "wicking" test data. According to the method used, a test sample (approximately 6 grams) was placed inside a ¾-inch length of copper tubing having a ½-inch outside diameter. After the outside of the copper tubing has been wiped clean and the ends had been made smooth with a metal spatula, one open end of the copper tubing was placed in the center of a No. 2 Whatman filter paper, 9 centimeters in diameter. This filter paper was then supported in such a manner that the whole center section within one inch of the center point was suspended in air to permit unhampered movement of oil outward from the test sample in the copper tube.

Table I hereinbelow presents wicking data of numerous compositions of the present invention. The figures noted under "wicking rate" were obtained by measuring the width, in millimeters, of the oil stain outside of the copper tubing at the time noted. The tests were conducted at temperatures of about 70° F. The stain width figure is the average of the measurements at four points 90 degrees apart.

*Table I*

| Sample No. | 1 | 2 | 3 | 4 | 5 | 6 | 7 | 8 | 9 |
|---|---|---|---|---|---|---|---|---|---|
| Composition (percent by wgt.): | | | | | | | | | |
| Base Oil [1] | 94 | 95 | 94.5 | 94 | 94.5 | | 93 | 93 | 93 |
| Base Oil [2] | | | | | | 95 | | | |
| Carnauba | | | | | | | 6 | | |
| Acrawax B [3] | 4 | 4 | 3 | | | | | | |
| Candelilla | | | | | | | | 6 | |
| Petroleum Wax | | | | 4 | | 3 | | | |
| Beeswax | | | | | | | | | 6 |
| Stroba Wax [3] | | | | | 3 | | | | |
| Polyethylene | 1 | 1 | 1.5 | 1 | 1.5 | 1 | 1 | 1 | 1 |
| Additive A [4] | 1 | | 1 | 1 | 1 | | | | |
| Physical Characteristics: | | | | | | | | | |
| Viscosity (SSU at 210° F.) | 81.4 | 81.4 | 63.6 | 55.3 | 146.3 | 83.1 | | | |
| Melting Point, °F. | 110-115 | 110-115 | 110-115 | 80-85 | 110-115 | less than 70 | | | |
| Wicking Rate (Width of stain outside of copper tube, mm.): | | | | | | | | | |
| After 5 minutes | 4 | 4 | 3.5 | 4 | 5 | 2 | 4 | 2.5 | 4 |
| After 10 minutes | 7.5 | 7.5 | 6 | 6.5 | 7 | 3.5 | 7 | 5 | 8 |
| After 30 minutes | 11 | 11 | 10 | 10 | 12 | 5 | | | |
| After 1 hour | 17 | 17 | 14 | 13 | 16 | 7 | 18 | 9 | 16 |
| After 2 hours | | | | | | | 25 | 11 | 21 |
| After 4 hours | 33 | 33 | | 22 | 29 | 12 | | | |

[1] A California solvent-refined base oil having a viscosity of 150 SSU at 100° F.
[2] A California solvent-refined base oil having a viscosity of 480 at 100° F.
[3] These waxes are sold under the noted tradenames by the Glyco Products Company, Inc. of Brooklyn, New York.
[4] Normally, after stationary filters have been cleaned, the elements are still damp or wet with water. In order to reduce the surface tension between the filter adhesive and the water, Additive A was incorporated in the oil. Additive A, which is a polyalkylene glycol ether surface active agent, has no effect on the "wicking rates" of an adhesive.

As tested by the above procedure, it is preferred that the filter adhesives have wicking rates no greater than 20 and no less than 4 after one hour. When faster wicking occurs, the oil is too fluid, dripping from the filter units. When slower wicking occurs, the filter is highly inefficient, permitting greater amounts of dust to pass through the unit.

Between base oils containing the identical amounts of the same polyethylene-wax mixture, the wicking tendency is governed by the viscosity of the base oil. The base oil having the lower viscosity has the highest wicking rate.

The efficiency of filter materials (i. e., permeable structural masses) is considerably improved by coating them with the filter adhesives of the present invention. Such filter materials include wire meshes, fibers, particles of various kinds, etc. prepared from glass, plastic fibers, plant substances, animal substances, ceramic substances, wood, rubber, etc. Filter materials are coated with the filter adhesives hereinabove by dipping the filter materials in wax-polyethylene thickened oils at temperatures less than the transition point, that is, less than 140° F.; or the filter adhesives can be sprayed onto the filter materials.

In addition to the polyethylene and wax, the filter adhesives of the present invention may contain other agents which are effective as oxidation inhibitors, rust inhibitors, corrosion inhibitors, viscosity improvers, etc.

I claim:

1. A filter adhesive composition comprising a major proportion of a hydrocarbon oil and from 4% to 6%, by weight, of a mixture of wax and polyethylene, wherein the mole ratio of wax to polyethylene has a value from 2 to 5, said wax having a melting point in the range of 90° C. to 140° C., and said polyethylene having a molecular weight in the range of 10,000 to 40,000.

2. A filter adhesive composition comprising a major proportion of a hydrocarbon lubricating oil and from about 1% to about 10%, by weight, of a thickening agent consisting essentially of wax and polyethylene, wherein the mole ratio of the wax to polyethylene has a value from 0.5 to 12, said wax having a melting point in the range of 90° C. to 140° C., and said polyethylene having a molecular weight in the range of 10,000 to 40,000.

3. A filter adhesive composition comprising a hydrocarbon lubricating oil thickened with from about 1% to about 10%, by weight, of a mixture of wax and polyethylene, said wax having a melting point in the range of 90° C. to 140° C., and said polyethylene having a molecular weight in the range of 10,000 to 40,000, wherein the mole ratio of the wax to polyethylene has a value from 2 to 5.

4. A filter adhesive composition comprising a hydrocarbon lubricating oil thickened with from about 4% to about 6%, by weight, of a mixture of wax and polyethylene, said wax having a melting point in the range of 90° C. to 140° C., and said polyethylene having a molecular weight in the range of 15,000 to 25,000, wherein the mole ratio of the wax to polyethylene has a value from 0.5 to 12.

5. A filter adhesive composition consisting essentially of a hydrocarbon lubricating oil having incorporated therein from about 4% to about 6%, by weight, of a mixture of wax and polyethylene, said wax having a melting point in the range of 90° C. to 140° C., said polyethylene having a molecular weight in the range of 15,000 to 25,000, and wherein the mole ratio of said wax to said polyethylene has a value from about 2 to about 5.

6. A filter adhesive composition consisting essentially of a hydrocarbon lubricating oil having incorporated therein from about 4% to about 6%, by weight, of a mixture of wax and a linear polyethylene, said wax having a melting point in the range of 90° C. to 140° C., said polyethylene having a molecular weight in the range of 15,000 to 25,000, and wherein the mole ratio of said wax to said polyethylene has a value from about 2 to about 5.

7. A filter adhesive composition comprising a major proportion of a hydrocarbon lubricating oil and from about 4% to about 6% of a thickening agent, wherein said thickening agent consists of petroleum wax and polyethylene, said wax having a melting point in the range of 90° C. to 140° C., said polyethylene having a molecular weight in the range of 15,000 to 25,000, and the mole ratio of said petroleum wax to said polyethylene having a value from about 2 to about 5.

8. A filter adhesive composition comprising a major proportion of a hydrocarbon lubricating oil and from about 4% to about 6% of a thickening agent, wherein said thickening agent consists of paraffin wax and polyethylene, said wax having a melting point in the range of 90° C. to 140° C., said polyethylene having a molecular weight in the range of 15,000 to 25,000, and the mole ratio of said paraffin wax to said polyethylene having a value from about 2 to about 5.

9. A filter adhesive composition comprising a major proportion of a hydrocarbon lubricating oil and from about 4% to about 6% of a thickening agent, wherein said thickening agent consists of beeswax and polyethylene, said wax having a melting point in the range of 90° C. to 140° C., said polyethylene having a molecular weight in the range of 15,000 to 25,000, and the mole ratio of said beeswax to said polyethylene having a value from about 2 to about 5.

References Cited in the file of this patent

UNITED STATES PATENTS

| | | |
|---|---|---|
| 2,019,241 | Weiss | Oct. 29, 1935 |
| 2,145,898 | Simpson | Feb. 7, 1939 |
| 2,627,938 | Frohmader et al. | Feb. 10, 1953 |
| 2,691,647 | Field et al. | Oct. 12, 1954 |